United States Patent
Zhou et al.

(10) Patent No.: US 11,309,818 B2
(45) Date of Patent: Apr. 19, 2022

(54) MOTOR VARIABLE FREQUENCY DRIVING SYSTEM AND MULTI-SPLIT CENTRAL AIR CONDITIONER

(71) Applicants: GD Midea Heating & Ventilating Equipment Co., Ltd., Foshan (CN); Midea Group Co., Ltd., Foshan (CN)

(72) Inventors: Chao Zhou, Foshan (CN); Takeshi Kokura, Foshan (CN); Xiong Qian, Foshan (CN)

(73) Assignees: GD Midea Heating & Ventilating Equipment Co., Ltd., Foshan (CN); Midea Group Co., Ltd., Foshan (CN)

(*) Notice: Subject to any disclaimer, the term of this patent is extended or adjusted under 35 U.S.C. 154(b) by 0 days.

(21) Appl. No.: 17/172,024

(22) Filed: Feb. 9, 2021

(65) Prior Publication Data

US 2021/0167709 A1 Jun. 3, 2021

Related U.S. Application Data

(63) Continuation of application No. PCT/CN2019/089190, filed on May 30, 2019.

(30) Foreign Application Priority Data

Aug. 20, 2018 (CN) .......................... 201810950544.2

(51) Int. Cl.
*H02P 6/00* (2016.01)
*H02P 6/16* (2016.01)
(Continued)

(52) U.S. Cl.
CPC .............. *H02P 21/22* (2016.02); *H02P 21/18* (2016.02); *H02P 27/08* (2013.01)

(58) Field of Classification Search
CPC ........... H02P 21/22; H02P 21/18; H02P 27/08
(Continued)

(56) References Cited

U.S. PATENT DOCUMENTS

| 2011/0043150 A1* | 2/2011 | Ogawa .............. H02M 7/53873 |
| | | 318/400.26 |
| 2011/0089693 A1* | 4/2011 | Nasiri .................. F03D 7/0272 |
| | | 290/44 |

(Continued)

FOREIGN PATENT DOCUMENTS

| CN | 102017395 A | 4/2011 |
| CN | 104934943 A | 9/2015 |

(Continued)

OTHER PUBLICATIONS

Guangdong Midea HVAC Equipment Co., Ltd., International Search Report / Written Opinion, PCT/CN2019/089190, dated Aug. 26, 2019, 10 pgs.

(Continued)

*Primary Examiner* — Erick D Glass
(74) *Attorney, Agent, or Firm* — Morgan, Lewis & Bochius LLP

(57) ABSTRACT

Disclosed are a motor variable frequency driving system and a multi-split central air conditioner. The motor variable frequency driving system includes: a three-phase alternating-current input, a rectification module, a thin-film capacitor, an inverter, a vector control module, an A/D sampling module and a steady state processing module. The rectification module is connected to the three-phase alternating-current input; the thin-film capacitor is arranged between output ends of a direct current output; an input end of the inverter is connected to an output end of the direct current output; an output end of the inverter is connected to a three-phase alternating current motor; the vector control module is connected to the inverter; the A/D sampling (Continued)

module is used for collecting direct current bus voltages of two ends of the thin-film capacitor; and the steady state processing module is connected to the A/D sampling module.

11 Claims, 3 Drawing Sheets

(51) Int. Cl.
*H02P 21/22* (2016.01)
*H02P 21/18* (2016.01)
*H02P 27/08* (2006.01)

(58) Field of Classification Search
USPC .......................................................... 318/811
See application file for complete search history.

(56) References Cited

U.S. PATENT DOCUMENTS

| 2014/0028237 | A1 | 1/2014 | Park et al. | |
| 2020/0321903 | A1* | 10/2020 | Harada | H02P 29/032 |

FOREIGN PATENT DOCUMENTS

| CN | 105490544 | A | 4/2016 |
| CN | 106330039 | A | 1/2017 |
| CN | 106655947 | A | 5/2017 |
| CN | 106655954 | A | 5/2017 |
| CN | 206850443 | U | 1/2018 |
| CN | 108923721 | A | 11/2018 |
| EP | 2284986 | | 2/2011 |
| JP | 2007181358 | A | 7/2007 |
| JP | 2016082662 | A | 5/2016 |
| JP | 2017009907 | | 2/2018 |

OTHER PUBLICATIONS

Guangdong Midea HVAC Equipment Co., Ltd., First Office Action, CN Application No. 201810950544.2, dated Mar. 2, 2020, 11 pgs.
Guangdong Midea HVAC Equipment Co., Ltd., Second Office Action, CN Application No. 201810950544.2, dated May 8, 2020, 14 pgs.
GD Midea Heating & Ventilating Equipment Co., Ltd., et al., Extended European Search Report, EP 19851217.0, dated Jul. 16, 2021, 7 pgs.
Office Action for IN Application No. 202127006324, dated Mar. 12, 2021, 7 pgs.

* cited by examiner

MOTOR VARIABLE FREQUENCY DRIVING SYSTEM AND MULTI-SPLIT CENTRAL AIR CONDITIONER

CROSS-REFERENCE TO RELATED APPLICATION

This application is a continuation of PCT International Application No. PCT/CN2019/089190, filed May 30, 2019, which claims the benefit of Chinese Patent Application No. 201810950544.2, filed on Aug. 20, 2018, each of which is incorporated by reference herein in its entirety.

TECHNICAL FIELD

The present disclosure relates to the field of motors, in particular to a motor variable frequency driving system, a multi-split central air conditioner, a permanent magnet motor driving system, a permanent magnet synchronous motor and a computer readable storage medium.

BACKGROUND

A traditional three-phase input three-phase output AC-DC-AC high-power motor variable frequency driving system can provide variable voltage and variable frequency independently from an input side to an output side, so that a motor can achieve variable voltage and variable frequency, wherein its input AC side is usually made up of diode bridge rectifier because of its cost effectiveness, and its output AC side is made up of typical PWM inverter. DC-Link between two AC sides is connected through a large-capacity electrolytic capacitor, and the large-capacity electrolytic capacitor of the DC-Link plays an important role in decoupling the electric quantity of the two AC sides with different frequencies and voltages.

In the related art, such an inverter DC-Link electrolytic capacitor is bulky per se, and an indispensable pre-charging circuit is needed to protect other devices from being damaged by large surge currents, so that the whole motor variable frequency driving system is quite bulky, heavy and expensive.

In addition, the service life of the electrolytic capacitor is much shorter than that of other electronic components in the driving system, and the service life of the electrolytic capacitor can determine the service life of the whole motor variable frequency driving system, so that the service life and capacity attenuation of the electrolytic capacitor greatly influence the service life of the motor variable frequency driving system.

SUMMARY

In order to solve at least one of the above-mentioned technical problems, it is an object of the present disclosure to provide a motor variable frequency driving system.

Another object of the present disclosure is to provide a multi-split central air conditioner.

In order to achieve the above object, the technical solution of the first aspect of the present disclosure provides a motor variable frequency driving system, including: a three-phase alternating-current input; a rectification module connected to the three-phase alternating-current input and used for converting the three-phase alternating-current input into a direct current output; a thin-film capacitor arranged between output ends of the direct current output; an inverter, with an input end of the inverter connected to the output end of the direct current output and an output end of the inverter connected to a three-phase alternating current motor; a vector control module connected to the inverter and used for generating a control instruction for controlling the inverter; an A/D sampling module used for collecting direct current bus voltages of two ends of the thin-film capacitor; and a steady state processing module connected to the A/D sampling module and used for carrying out steady state processing on the direct current bus voltage and outputting a compensation parameter to the vector control module.

In the technical solution, a thin-film capacitor is adopted to replace a large-capacity electrolytic capacitor in a DC-Link so as to meet the requirements of decoupling different frequencies and voltages between three-phase input and three-phase output on two sides, the size of the whole frequency converter is favorably reduced, and the preparation cost is reduced. A steady state processing module is arranged to compensate for the reduction of stability and controllability of the system caused by the removal of large-capacity electrolytic capacitor on the premise of not reducing the performance of the motor variable frequency driving system, and the stability of control can be guaranteed.

The steady state processing module can be realized through a control algorithm.

In addition, the motor variable frequency driving system in some of the above-mentioned embodiments provided by the present disclosure can also have the following additional technical features:

In the technical solution, the steady state processing module includes: a low-pass filter with one end of the low-pass filter connected to the A/D sampling module, used for low-pass filtering the direct current bus voltage; a high-pass filter arranged in parallel with the low-pass filter, with one end of the high-pass filter connected to the A/D sampling module, used for high-pass filtering the direct current bus voltage; and a torque instruction correction unit respectively connected with the other end of the low-pass filter and the other end of the high-pass filter, used for outputting a compensation instruction.

According to the technical solution, the low-pass filter and the high-pass filter are respectively arranged to filter the voltage signals at the two ends of the thin-film capacitor collected by the A/D sampling module, so that the alternating-current pulsating ripple coefficient is reduced, the output of the direct current power supply rectified by the rectifier is smoother. Further, the voltage signals filtered by the low-pass filter and the high-pass filter are input into a torque instruction correction unit, and the original torque instruction or torque current instruction is added with a correction value corresponding to a voltage component containing a high-frequency angular frequency of a resonance angular frequency determined from a constant on the direct current bus voltage side. Therefore, when the direct current bus voltage $V_{dc}$ rises due to vibration and the like, the output of the inverter can be increased by increasing the torque to suppress the rise of the direct current bus voltage $V_{dc}$, and when the direct current bus voltage $V_{dc}$ falls, the output of the inverter can be decreased by decreasing the torque to reduce the direct current bus voltage $V_{dc}$. Therefore, the stability of the direct current bus voltage is improved.

The correction instruction output by the torque instruction correction unit is different according to different types of motors, and can be used for compensating torque or current.

In any of the technical solutions, the vector control module further includes: an SVPWM unit used for outputting a control instruction to the inverter; and the steady state processing module further includes: a high-frequency component processing unit, with one end of the high-frequency component processing unit connected to the A/D sampling module and the other end of the high-frequency component processing unit connected to the SVPWM unit, used for correcting the control instruction output by the SVPWM unit.

In the technical solution, since the voltage rises at the moment when the amplitude of the actual resonance voltage component in the direct current bus voltage $V_{dc}$ decreases, and the voltage decreases at the moment when the amplitude increases, the high-frequency component processing unit is further arranged to extract and process the high-frequency component in the direct current bus voltage $V_{dc}$ through the high-frequency component processing unit, and the high-frequency component is processed and input into the SVPWM unit to be displayed when the voltage is converted into modulation rate. Therefore, the stability of the system is improved, and further, the influence on the stability and controllability of the motor control system caused by the change of a circuit topology structure is reduced by a correction algorithm of the torque instruction and a high-frequency component extraction and reprocessing algorithm of $V_{dc}$ in combination with the torque instruction correction unit.

Specifically, a three-phase input electrolytic capacitor-free frequency converter includes a three-phase AC input 1 (including a power supply and wiring impedance), the rectification module includes six three-phase uncontrollable diodes, current is rectified by the rectification module and passes through a thin-film capacitor with low capacity. Due to the low capacity of the thin-film capacitor, it can only be designed for absorbing harmonic currents contained in the $I_{dc}$ waveforms with variable frequency at the DC-Link side, but a pulsating voltage component of 6 times the frequency of the power supply frequency cannot be absorbed, and the unstable tendency caused by fluctuating direct current bus voltage $V_{dc}$ is counteracted by arranging a high-pass filter, a low-pass filter, a torque instruction correction unit and a high-frequency component processing unit, so that the working stability of the whole motor control system is improved.

In addition, the SVPWM unit outputs six paths of PWM waves, and the six paths of PWM waves pass through the optocoupler isolation circuit and pass through the driving circuit to control the power tube of the inverter to be switched on and off so as to drive the motor to rotate.

In any of the technical solutions, the vector control module includes: a rotation speed estimation unit used for estimating a rotation speed of the motor according to input voltage and current and determining the rotation speed as a feedback rotation speed instruction; and a rotation speed regulator used for converting a difference between a rotation speed control instruction to the motor and the feedback rotation speed instruction into an initial instruction so as to generate an adjustment instruction according to the initial instruction and the compensation instruction.

According to the technical solution, the rotation speed estimation unit is arranged to estimate the rotation speed of the motor in the running process of the motor, so that the rotation speed of the motor can be input into the rotation speed regulator as a feedback rotation speed together with the control rotation speed input by a user, the rotation speed regulator is arranged to enable a rotation speed loop to be in an open-loop state, and the output of the rotation speed regulator is taken as a given value of the motor torque together with the compensation instruction output by the instruction correction module.

In any of the technical solutions, the vector control module further includes: a Clarke coordinate conversion unit used for converting input three-phase currents $I_a$, $I_b$ and $I_c$ under a three-phase static coordinate system into currents $I_{\alpha\_fbk}$ and $I_{\beta\_fbk}$ under a two-phase static coordinate system; and a Park coordinate conversion unit used for converting $I_{\alpha\_fbk}$ and $I_{\beta\_fbk}$ under the two-phase static coordinate system into feedback currents $I_{d\_fbk}$ and $I_{q\_fbk}$ under a two-phase rotation coordinate system.

In the technical solution, the Clarke coordinate conversion unit and the Park coordinate conversion unit are respectively arranged to convert the current under the three-phase static coordinate to a feedback current under the two-phase rotation coordinate system.

In any of the technical solutions, when the three-phase alternating current motor is a permanent magnet synchronous motor, the rotation speed estimation unit is a first rotation speed estimation unit, and an input end of the first rotation speed estimation unit is used for receiving collected $I_d$, $I_q$, $U_d$ and $U_q$ of the motor and outputting an estimated rotation speed according to $I_d$, $I_q$, $U_d$ and $U_q$ of the motor, thus determining the estimated rotation speed as the feedback rotation speed instruction.

According to the technical solution, the estimation modes of the rotation speed estimation module are different according to different types of motors. When the motor is a permanent magnet synchronous motor, currents and voltages in the two-phase rotation coordinate system are input into the rotation speed estimation module, the estimated rotation speed is determined according to input parameters and fed back to the rotation speed loop of the switch.

In any of the technical solutions, the compensation instruction is a torque compensation instruction while the initial instruction is a torque initial instruction to determine the adjustment instruction as a torque control instruction, and the vector control module further includes: a maximum torque per Ampere unit, with an input end of the maximum torque per Ampere unit used for inputting the torque control instruction and an output end of the maximum torque per Ampere unit used for outputting torque current control instructions $I_{d\_ref}$ and $I_{q\_ref}$ under the two-phase rotation coordinate system.

In the technical solution, in a permanent magnet synchronous motor, a maximum torque per Ampere unit (MTPA) is arranged to obtain a direct-axis control current $I_{d\_ref}$ and a quadrature-axis control current $I_{q\_ref}$ according to an input torque control instruction, and the direct-axis control current $I_{d\_ref}$ and the quadrature-axis control current $I_{q\_ref}$ are input into a current regulator to obtain a control voltage of the SVPWM unit.

In any of the technical solutions, when the three-phase alternating current motor is an alternating current asynchronous motor, the rotation speed estimation unit is a second rotation speed estimation unit, and an input end of the second rotation speed estimation unit is used for receiving collected $I_\alpha$, $I_\beta$, $U_\alpha$ and $U_\beta$ of the motor and outputting an estimated rotation speed according to $I_\alpha$, $I_\beta$, $U_\alpha$ and $U_\beta$ of the motor, thus determining a sum of the estimated rotation speed and a spin differential rotation speed as the feedback rotation speed instruction.

According to the technical solution, when the motor is an alternating-current asynchronous motor, the current and the voltage under the two-phase static coordinate system are input by the rotation speed estimation module, the estimated rotation speed is determined according to input parameters and fed back to the rotation speed loop of the switch in combination with the slip differential rotation speed.

In any of the technical solutions, the compensation instruction is a torque current compensation instruction while the initial instruction is a torque current initial instruction to determine the adjustment instruction as a torque current control instruction $I_{d\_ref}$ and $I_{q\_ref}$.

According to the technical solution, when the motor is an alternating-current asynchronous motor, MTPA control is not needed, and $I_{qComp}$ output by the instruction correction module is added to the output $I_{qOriginal}$ of the speed regulator to serve as $I_{q\_ref}$, which is combined with $I_{d\_ref}$ as the torque current control instruction.

In any of the technical solutions, the vector control module further includes: a current regulator, an input end of the current regulator respectively inputting a difference value between $I_{d\_ref}$ and $I_{d\_fbk}$ and a difference value between $I_{q\_ref}$ and $I_{q\_fbk}$, an output end of the current regulator being used for outputting control voltages $V_d$ and $V_q$ to the SVPWM unit.

In the technical solution, a current regulator is arranged to generate control voltages $V_d$ and $V_q$ so as to realize voltage modulation in the SVPWM unit through inputting $V_d$ and $V_q$ and output six paths of pulsating modulation signals through the SVPWM unit to control on-off of the power tube in the inverter.

In any of the technical solutions, the vector control module further includes: an integration unit used for converting the feedback rotation speed instruction into an angle instruction and inputting the angle instruction to the Park coordinate conversion unit.

The technical solution of the second aspect of the present disclosure provides a multi-split central air conditioner, including: the motor variable frequency driving system according any one of the technical solutions of the first aspect of the present disclosure.

One or more technical solutions provided in the embodiments of the present disclosure have at least the following technical effects or advantages.

(1) According to the hardware topological structure of the three-phase input electrolytic capacitor-free frequency converter provided by the present disclosure, the huge, heavy and expensive electrolytic capacitors in the DC-Link are removed, thin film capacitors with low capacity and high reliability are used instead, and the cost of the whole electric control hardware is greatly reduced.

(2) According to the hardware topological structure of the three-phase input electrolytic capacitor-free frequency converter provided by the present disclosure, the circuit for initially charging the electrolytic capacitor and the PTC thermistor are removed, so that the hardware cost can be further reduced.

(3) The three-phase input electrolytic capacitor-free frequency converter of the present disclosure is not only suitable for a permanent magnet synchronous motor (PMSM) but also suitable for an alternating current asynchronous motor (ACM).

(4) After the capacity of the capacitor in the DC-Link of the three-phase input electrolytic capacitor-free frequency converter of the present disclosure is reduced to no more than 1% of that of the electrolytic capacitor frequency converter in the related art, the problem of the stability of the motor control system caused by lack of the electrolytic capacitor is restrained by arranging the torque compensation unit, so that the stability of the variable frequency driving system is guaranteed.

(5) After the capacity of the capacitor in the DC-Link of the three-phase input electrolytic capacitor-free frequency converter of the present disclosure is reduced to no more than 1% of that of the traditional frequency converter, the high-frequency component processing unit is arranged to extract and reprocess the high-frequency component of the direct current bus voltage $V_{dc}$, so that the output control instruction of the inverter can be corrected according to the change of the direct current voltage, and the control of the output control instruction is realized.

Additional aspects and advantages of the present disclosure will be apparent from the description which follows, or may be learned by practice of the present disclosure.

BRIEF DESCRIPTION OF THE DRAWINGS

The foregoing and/or additional aspects and advantages of the present disclosure will be apparent from and elucidated with reference to the embodiments described hereinafter with reference to the accompanying drawings, in which.

Figure 1:
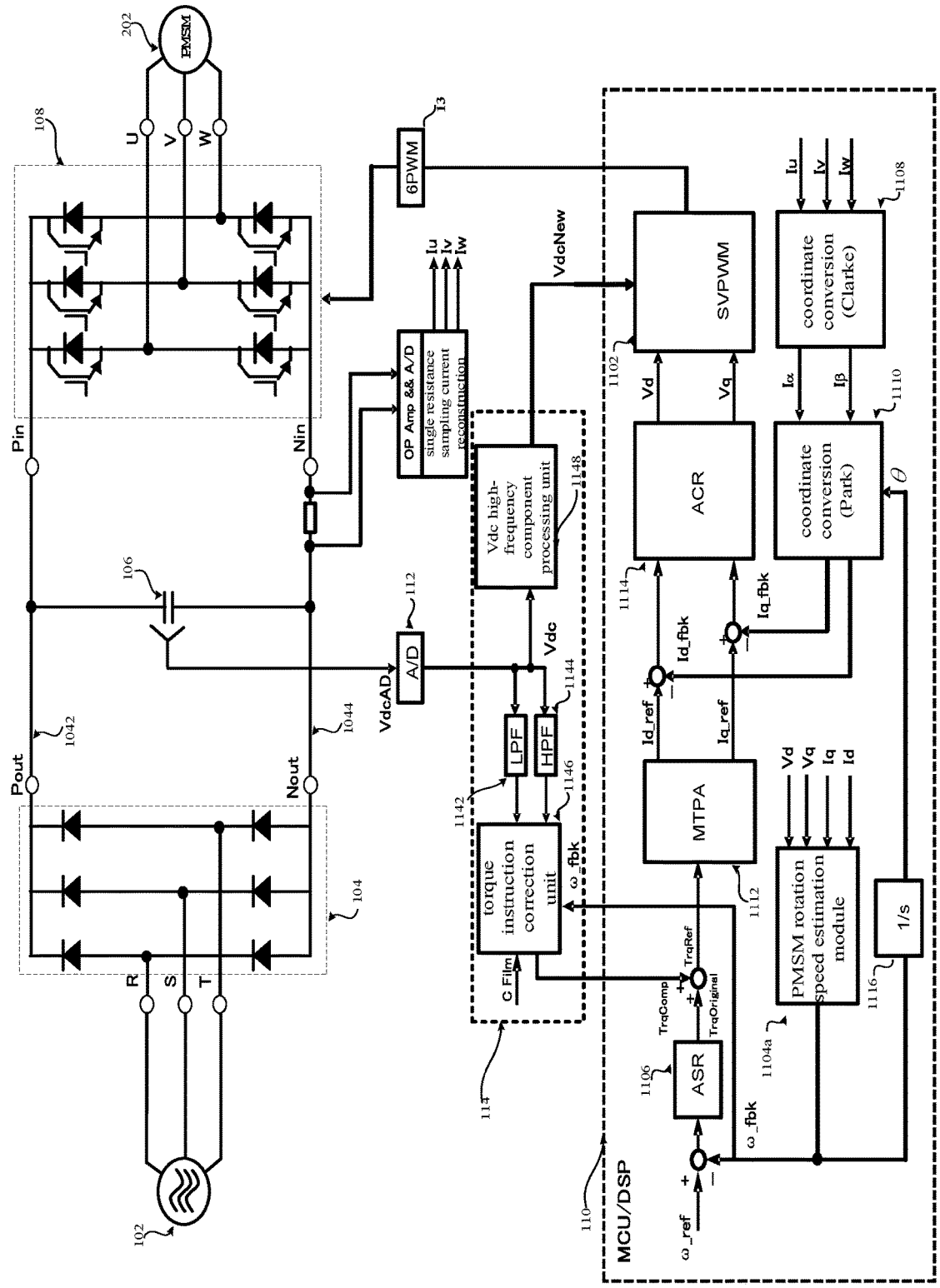
FIG. 1 shows a schematic block diagram of a motor variable frequency driving system according to some embodiments of the present disclosure.

REFERENCE NUMERALS 102 three-phase alternating-current input, 104 rectification module, 106 thin-film capacitor, 108 inverter, 110 vector control module, 112 A/D sampling module, 114 steady state processing module, 1142 low-pass filter, 1144 high-pass filter, 1146 instruction correction unit, 1102 SVPWM unit, 1148 high-frequency component processing unit, 1104a PMSM rotation speed estimation unit, 1104b ACM rotation speed estimation unit, 1106 rotation speed regulator, 1108 Clarke coordinate conversion unit, 1110 Park coordinate conversion unit, 1112 maximum torque per Ampere unit, 114 current regulator, 116 integration unit, 1042 Pout, 1044 Nout, 202 permanent magnet synchronous motor, 204 alternating current asynchronous motor.

DETAILED DESCRIPTION

In order that the objects, features and advantages of the present disclosure may be more clearly understood, the present disclosure is described in further detail below with reference to the accompanying drawings and detailed description. It should be noted that the embodiments and features in the embodiments of the present disclosure may be combined with one another without conflict.

In the following description, numerous specific details are set forth in order to provide a thorough understanding of the present disclosure, but the present disclosure may be practiced otherwise than as described herein, and therefore, the scope of the present disclosure is not limited to the specific embodiments disclosed below.

A motor variable frequency driving system according to some embodiments of the present disclosure is described below with reference to FIGS. 1 and 2.

Figure 2:
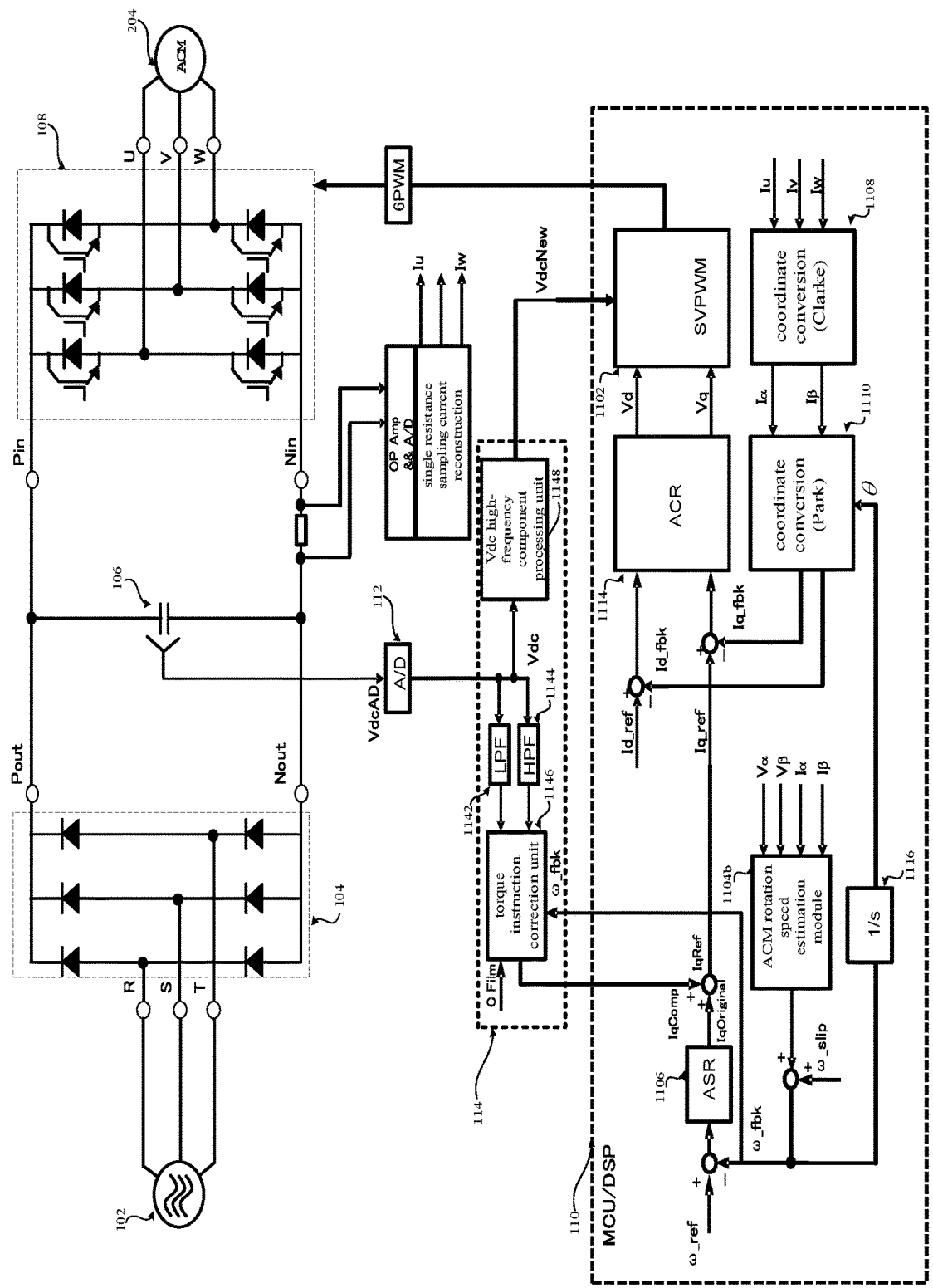
FIG. 2 shows a schematic block diagram of a motor variable frequency driving system according to some embodiments of the present disclosure.
Figure 3:
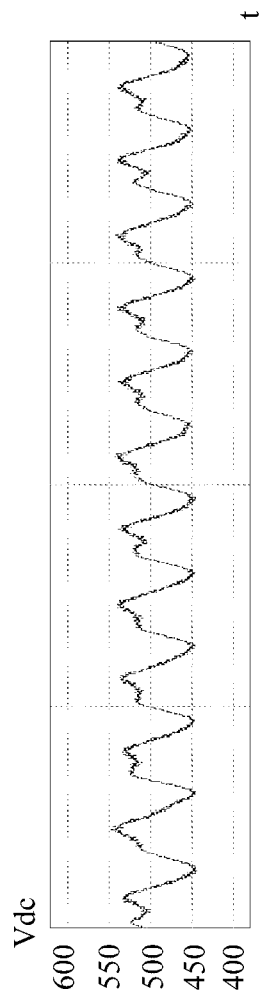
FIG. 3 shows a graph of direct current bus voltage in a motor variable frequency driving system according to some embodiments of the present disclosure.

As shown in FIGS. 1 and 2, a motor variable frequency driving system according to some embodiments of the present disclosure includes: a three-phase alternating-current input 102; a rectification module 104 connected to the three-phase alternating-current input 102 and used for converting the three-phase alternating-current input 102 into direct current output; a thin-film capacitor 106 arranged between output ends of the direct current output; an inverter with an input end of the inverter 108 connected to an output end of the direct current output and an output end of the inverter 108 connected to the three-phase alternating-current motor; a vector control module 110 connected to the inverter 108 and used for generating a control instruction controlling the inverter 108; an A/D sampling module 112 used for collecting direct current bus voltage at two ends of the thin-film capacitor 106; and a steady state processing module 114 connected to the A/D sampling module 112 and used for carrying out steady state processing on the direct current bus voltage and outputting compensation parameters to the vector control module 110.

In the technical solution, a thin-film capacitor 106 is adopted to replace a large-capacity electrolytic capacitor in a DC-Link so as to meet the requirements of decoupling different frequencies and voltages between three-phase input and three-phase output on two sides, the size of the whole frequency converter is favorably reduced, and the preparation cost is reduced. A steady state processing module 114 is arranged to compensate for the reduction of stability and controllability of the system caused by the removal of large-capacity electrolytic capacitor on the premise of not reducing the performance of the motor variable frequency driving system, and the stability of control can be guaranteed.

The steady state processing module 114 may be implemented with a control algorithm.

As shown in FIGS. 1 and 2, in the above-described embodiment, the steady state processing module 114 includes: a low pass filter 1142 (LPF) with one end of the low pass filter 1142 connected to the A/D sampling module 112 for low pass filtering the direct current bus voltage; a high-pass filter 1144 (HPF) arranged in parallel with the low-pass filter 1142, with one end of the high-pass filter 1144 connected to the A/D sampling module 112 for high-pass filtering the direct current bus voltage; a torque instruction correction unit 1146 connected to the other end of the low pass filter 1142 and the other end of the high pass filter 1144, respectively, for outputting a compensation instruction.

In this embodiment, the low-pass filter 1142 and the high-pass filter 1144 are provided to filter the voltage signal on two ends of the thin-film capacitor 106 collected by the A/D sampling module 112, thereby reducing the alternating-current pulsating ripple coefficient to make the direct current power output rectified by the rectifier smoother. Further, the voltage signal filtered by the low-pass filter 1142 and the high-pass filter 1144 is input to the torque instruction correction unit 1146. A correction value corresponding to a voltage component containing a high-frequency angular frequency of a resonance angular frequency determined by a constant on the direct current bus voltage side is added to the original torque instruction or the torque current instruction, so that the output of the inverter 108 can be increased by increasing the torque to suppress the rise of the direct current bus voltage $V_{dc}$ when the direct current bus voltage $V_{dc}$ rises due to vibration or the like, and the output of the inverter 108 can be decreased by decreasing the torque when the direct current bus voltage $V_{dc}$ falls, such that the direct current bus voltage $V_{dc}$ is reduced, and the stability of the direct current bus voltage is improved.

Here, the correction instructions output by the torque instruction correction unit 1146 are different depending on different types of motors, and may be compensation for torque or compensation for current.

As shown in FIGS. 1 and 2, in any of the embodiments, the vector control module 110 further includes: an SVPWM (Space Vector Pulse Width Modulation) unit 1102 for outputting a control instruction to the inverter 108; the steady state processing module 114 also includes: a high-frequency component processing unit 1148 with one end of the high-frequency component processing unit 1148 connected to the A/D sampling module 112, and the other end of the high-frequency component processing unit 1148 connected to the SVPWM unit 1102 for correcting the control instruction output by the SVPWM unit 1102.

In the embodiment, since the voltage rises at the moment when the amplitude of the actual resonance voltage component in the direct current bus voltage $V_{dc}$ decreases, and the voltage decreases at the moment when the amplitude increases, the high-frequency component processing unit 1148 is further arranged to extract and process the high-frequency component in the direct current bus voltage $V_{dc}$ through the high-frequency component processing unit 1148, and the high-frequency component is processed and input into the SVPWM unit 1102 to be displayed when the voltage is converted into modulation rate. Therefore, the stability of the system is improved, and further, the influence on the stability and controllability of the motor control system caused by the change of a circuit topology structure is reduced by a correction algorithm of the torque instruction and a high-frequency component extraction and reprocessing algorithm of $V_{dc}$ in combination with the torque instruction correction unit 1146.

Specifically, a three-phase input electrolytic capacitor-free frequency converter includes a three-phase AC input 1 (including a power supply and wiring impedance), the rectification module 104 includes six three-phase uncontrollable diodes j, current is rectified by the rectification module 104 and reaches between 1042 Pout and 1044 Nout, having a waveform of pulsating frequency of six times that of the power supply. It passes through a thin-film capacitor 106 with low capacity. Due to the low capacity of the thin-film capacitor 106, it can only be designed for absorbing harmonic currents contained in the $I_{dc}$ waveforms with variable frequency at the DC-Link side, but a pulsating voltage component of 6 times the frequency of the power supply frequency cannot be absorbed, and the unstable tendency caused by fluctuating direct current bus voltage $V_{dc}$ is counteracted by arranging a high-pass filter 1144, a low-pass filter 1142, a torque instruction correction unit 1166 and a high-frequency component processing unit 1148, so that the working stability of the whole motor control system is improved.

In addition, the SVPWM unit 1102 outputs six paths of PWM waves, and the six paths of PWM waves pass through the optocoupler isolation circuit and pass through the driving circuit to control the power tube of the inverter 108 to be switched on and off so as to drive the motor to rotate.

Figure 4:
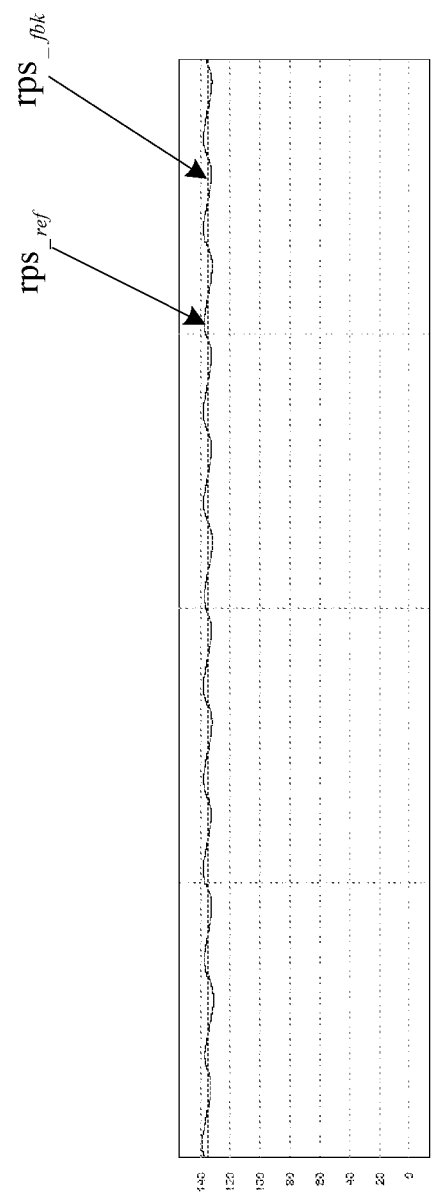
FIG. 4 shows a graph of direct-axis control current versus direct-axis feedback current in the motor variable frequency driving system according to some embodiments of the present disclosure.

As shown in FIG. 4, by providing the steady state processing module 114 including the high-pass filter 1144, the low-pass filter 1142, the torque instruction correction unit 1146, and the high-frequency component processing unit

1148, it is possible to make the given rotation speed of the motor substantially coincide with the feedback rotation speed, and the actual angle and the estimated angle of the motor also substantially coincide, so that the speed regulation performance thereof can be ensured.

As shown in FIGS. 1 and 2, in any of the embodiments, the vector control module 110 includes: a rotation speed estimation unit used for estimating the rotation speed of the motor according to input voltage and current and determining the rotation speed as a feedback rotation speed instruction; and a rotation speed regulator 1106 (ASR) is used for converting a difference between the rotation speed control instruction to the motor and the feedback rotation speed instruction into an initial instruction so as to generate an adjustment instruction according to the initial instruction and the compensation instruction.

In this embodiment, the rotation speed estimation unit is arranged to estimate the rotation speed of the motor in the running process of the motor, so that the rotation speed of the motor can be input into the rotation speed regulator 1106 as a feedback rotation speed together with the control rotation speed input by a user, the rotation speed regulator 1106 is arranged to enable a rotation speed loop to be in an open-loop state, and the output of the rotation speed regulator 1106 is taken as a given value of the motor torque together with the compensation instruction output by the instruction correction module.

As shown in FIGS. 1 and 2, in any of the embodiments, the vector control module 110 further includes: a Clarke coordinate conversion unit 1108 used for converting input three-phase currents $I_a$, $I_b$ and $I_c$ under a three-phase static coordinate system into currents $I_{\alpha\_fbk}$ and $I_{\beta\_fbk}$ under a two-phase static coordinate system; and a Park coordinate conversion unit 1110 used for converting $I_{\alpha\_fbk}$ and $I_{\beta\_fbk}$ under the two-phase static coordinate system into feedback currents $I_{d\_fbk}$ and $I_{q\_fbk}$ under a two-phase rotation coordinate system.

In the embodiment, the Clarke coordinate conversion unit 1108 and the Park coordinate conversion unit 1110 are respectively arranged to convert the current under the three-phase static coordinate to a feedback current under the two-phase rotation coordinate system, respectively.

As shown in FIG. 1, in any of the embodiments, when the three-phase alternating current motor is a permanent magnet synchronous motor 202 (PMSM), the rotation speed estimation unit is a first rotation speed estimation unit 1104a, and an input end of the first rotation speed estimation unit 1104a (PMSM rotation speed estimation unit) is used for receiving collected $I_d$, $I_q$, $U_d$ and $U_q$ of the motor and outputting an estimated rotation speed according to $I_d$, $I_q$, $U_d$ and $U_q$ of the motor, thus determining the estimated rotation speed as the feedback rotation speed instruction.

In the embodiment, the estimation modes of the rotation speed estimation module are different according to different types of motors. When the motor is a permanent magnet synchronous motor 202, currents and voltages in the two-phase rotation coordinate system are input into the rotation speed estimation module, the estimated rotation speed is determined according to input parameters and fed back to the rotation speed loop of the switch.

As shown in FIG. 1, in any of the embodiments, the compensation instruction is a torque compensation instruction while the initial instruction is a torque initial instruction to determine the adjustment instruction as a torque control instruction, and the vector control module 110 further includes: a maximum torque per Ampere unit 1112, with an input end of the maximum torque per Ampere unit 1112 used for inputting the torque control instruction and an output end of the maximum torque per Ampere unit 1112 used for outputting torque current control instructions $I_{d\_ref}$ and $I_{q\_ref}$ under the two-phase rotation coordinate system.

In the embodiment, in the permanent magnet synchronous motor 202, a maximum torque per Ampere unit 1112 (MTPA) is arranged to obtain a direct-axis control current $I_{d\_ref}$ and a quadrature-axis control current $I_{q\_ref}$ according to an input torque control instruction, and the direct-axis control current $I_{d\_ref}$ and the quadrature-axis control current $I_{q\_ref}$ are input into a current regulator 1114 to obtain a control voltage of the SVPWM unit 1102.

As shown in FIG. 2, in any of the embodiments, when the three-phase alternating current motor is an alternating current asynchronous motor 204, the rotation speed estimation unit is a second rotation speed estimation unit 1104b (ACM rotation speed estimation unit), and an input end of the second rotation speed estimation unit 1104b is used for receiving collected $I_\alpha$, $I_\beta$, $U_\alpha$ and $U_\beta$ of the motor and outputting an estimated rotation speed according to $I_\alpha$, $I_\beta$, $U_\alpha$ and $U_\beta$ of the motor, thus determining a sum of the estimated rotation speed and a spin differential rotation speed as the feedback rotation speed instruction.

In the embodiment, when the motor is the alternating-current asynchronous motor 204 (ACM), the current and the voltage under the two-phase static coordinate system are input by the rotation speed estimation module, the estimated rotation speed is determined according to input parameters and fed back to the rotation speed loop of the switch in combination with the slip differential rotation speed.

As shown in FIG. 2, in any of the embodiments, the compensation instruction is a torque current compensation instruction and the initial instruction is a torque current initial instruction to determine the adjustment instruction as a torque current control instruction $I_{d\_ref}$ and $I_{q\_ref}$.

In the embodiment, when the motor is the alternating-current asynchronous motor 204, MTPA control is not needed, and $I_{qComp}$ output by the instruction correction module is added to the output $I_{qOriginal}$ of the speed regulator to serve as $I_{q\_ref}$, which is combined with $I_{d\_ref}$ as the torque current control instruction.

As shown in FIGS. 1 and 2, in any of the embodiments, the vector control module 110 further includes: a current regulator 1114 (ACR), an input end of the current regulator 1114 respectively inputting a difference value between $I_{d\_ref}$ and $I_{d\_fbk}$ and a difference value between $I_{q\_ref}$ and $I_{q\_fbk}$ an output end of the current regulator 1114 being used for outputting control voltages $V_d$ and $V_q$ to the SVPWM unit 1102.

In the embodiment, a current regulator 1114 is arranged to generate control voltages $V_d$ and $V_q$ so as to realize voltage modulation in the SVPWM unit 1102 through inputting $V_d$ and $V_q$ and output six paths of pulsating modulation signals through the SVPWM unit 1102 to control on-off of the power tube in the inverter 108.

As shown in FIGS. 1 and 2, in any of the embodiments, the vector control module 110 further includes: an integration unit 1116 used for converting the feedback rotation speed instruction into an angle instruction and inputting the angle instruction to the Park coordinate conversion unit 1110.

A multi-split central air conditioner according to some embodiments of the present disclosure includes the motor variable frequency driving system according to any one of the embodiments.

In present disclosure, the terms "first", "second", and "third" are used for descriptive purposes only and are not to be construed as indicating or implying relative importance. The term "plurality" refers to two or more, unless explicitly defined otherwise. The terms "mounted", "interconnected", "connected", "fixed", and the like are to be construed broadly, e.g., "connected" may be a fixed connection, a releasable connection, or an integral connection. "Connected" may be directly connected or indirectly connected through an intermediary. The specific meaning of the terms in present disclosure will be understood by those of ordinary skill in the art, as the case may be.

In the description of the present disclosure, it is to be understood that the terms "upper", "lower", "left", "right", "front", "back", and the like indicate oriental or positional relationships that are based on the oriental or positional relationships shown in the drawings and are merely intended to facilitate the description of the present disclosure and to simplify the description and are not intended to indicate or imply that a particular orientation of the referenced device or element is required, or constructions and operations are in particular orientations. Therefore, they are not to be construed as limiting the present disclosure.

In the description of the present specification, the description of the terms "one embodiment", "some embodiments", "specific embodiments", etc., means that a particular feature, structure, material, or characteristic described in connection with some embodiments or example is included in at least some other embodiments or example of the present disclosure. In this specification, schematic representations of those terms do not necessarily refer to the same embodiments or example. Furthermore, the particular features, structures, materials, or characteristics described may be combined in any suitable manner in any one or more embodiments or examples.

The foregoing is merely some preferred embodiments of the present disclosure and is not intended to limit the present disclosure, as various modifications and changes therein will occur to those skilled in the art. Any modifications, equivalents, improvements, etc. that come within the spirit and principles of present disclosure are intended to be included within the scope of present disclosure.

What is claimed is:

1. A motor variable frequency driving system, comprising:
   a three-phase alternating-current input;
   a rectification module connected to the three-phase alternating-current input and used for converting the three-phase alternating-current input into a direct current output;
   a thin-film capacitor arranged between output ends of the direct current output;
   an inverter, with an input end of the inverter connected to the output end of the direct current output and an output end of the inverter connected to a three-phase alternating current motor;
   a vector control module connected to the inverter and used for generating a control instruction for controlling the inverter;
   an A/D sampling module used for collecting direct current bus voltages of two ends of the thin-film capacitor; and
   a steady state processing module connected to the A/D sampling module and used for carrying out steady state processing on the direct current bus voltage and outputting a compensation parameter to the vector control module, wherein
   the vector control module further comprises: an SVPWM unit used for outputting a control instruction to the inverter; and
   the steady state processing module further comprises: a high-frequency component processing unit, with one end of the high-frequency component processing unit connected to the A/D sampling module and the other end of the high-frequency component processing unit connected to the SVPWM unit, used for correcting the control instruction output by the SVPWM unit, and wherein the high-frequency component processing unit is configured to extract and reprocess a high-frequency component of the direct current bus voltage.

2. The motor variable frequency driving system according to claim 1, wherein the steady state processing module comprises:
   a low-pass filter with one end of the low-pass filter connected to the A/D sampling module, used for low-pass filtering the direct current bus voltage;
   a high-pass filter arranged in parallel with the low-pass filter, with one end of the high-pass filter connected to the A/D sampling module, used for high-pass filtering the direct current bus voltage; and
   a torque instruction correction unit respectively connected with the other end of the low-pass filter and the other end of the high-pass filter, used for outputting a compensation instruction.

3. The motor variable frequency driving system according to claim 1, wherein the vector control module comprises:
   a rotation speed estimation unit used for estimating a rotation speed of the motor according to input voltage and current and determining the rotation speed as a feedback rotation speed instruction; and
   a rotation speed regulator used for converting a difference between a rotation speed control instruction to the motor and the feedback rotation speed instruction into an initial instruction so as to generate an adjustment instruction according to the initial instruction and the compensation instruction.

4. The motor variable frequency driving system according to claim 3, wherein the vector control module further comprises:
   a Clarke coordinate conversion unit used for converting input three-phase currents $I^a$, $I^b$ and $I^c$ under a three-phase static coordinate system into currents $I_{\alpha\_fbk}$ and $I_{\beta\_fbk}$ a two-phase static coordinate system; and
   a Park coordinate conversion unit used for converting $I_{\alpha\_fbk}$ and $I_{\beta\_fbk}$ under the two-phase static coordinate system into feedback currents $I_{d\_fbk}$ and $I_{q\_fbk}$ under a two-phase rotation coordinate system.

5. The motor variable frequency driving system according to claim 4, wherein when the three-phase alternating current motor is a permanent magnet synchronous motor,
   the rotation speed estimation unit is a first rotation speed estimation unit, and an input end of the first rotation speed estimation unit is used for receiving collected $I_d$, $I_q$, $U_d$ and $U_q$ of the motor and outputting an estimated rotation speed according to $I_d$, $I_q$, $U_d$ and $U_q$ of the motor, thus determining the estimated rotation speed as the feedback rotation speed instruction.

6. The motor variable frequency driving system according to claim 4, wherein the vector control module further comprises:
   an integration unit used for converting the feedback rotation speed instruction into an angle instruction and inputting the angle instruction to the Park coordinate conversion unit.

7. The motor variable frequency driving system according to claim 5, wherein the compensation instruction is a torque compensation instruction while the initial instruction is a torque initial instruction to determine the adjustment instruction as a torque control instruction, and the vector control module further comprises:

a maximum torque per Ampere unit, with an input end of the maximum torque per Ampere unit used for inputting the torque control instruction and an output end of the maximum torque per Ampere unit used for outputting torque current control instructions $I^{d\_ref}$ and $I^{q\_ref}$ under the two-phase rotation coordinate system.

8. The motor variable frequency driving system according to claim 7, wherein the vector control module further comprises:

a current regulator, an input end of the current regulator respectively inputting a difference value between $I_{d\_ref}$ and $I^{d\_fbk}$ and a difference value between $I^{q\_ref}$ and $I^{q\_fbk}$, an output end of the current regulator being used for outputting control voltages $V_d$ and $V_q$ to the SVPWM unit.

9. The motor variable frequency driving system according to claim 4, wherein when the three-phase alternating current motor is an alternating current asynchronous motor, the rotation speed estimation unit is a second rotation speed estimation unit, and an input end of the second rotation speed estimation unit is used for receiving collected $I_\alpha$, $I_\beta$, $U_\alpha$ and $U_\beta$ of the motor and outputting an estimated rotation speed according $I_\alpha$, $I_\beta$, $U_\alpha$ and $U_\beta$ of the motor, thus determining a sum of the estimated rotation speed and a spin differential rotation speed as the feedback rotation speed instruction.

10. The motor variable frequency driving system according to claim 9, wherein the compensation instruction is a torque current compensation instruction while the initial instruction is a torque current initial instruction to determine the adjustment instruction as a torque current control instruction $I_{d\_ref}$ and $I_{q\_ref}$.

11. A multi-split central air conditioner, comprising:

the motor variable frequency driving system according to claim 1.

* * * * *